United States Patent
Rupp et al.

(10) Patent No.: US 6,806,694 B2
(45) Date of Patent: Oct. 19, 2004

(54) SWITCHING REGULATOR WITH DYNAMIC CURRENT LIMITING AND DRIVE CIRCUIT FOR THE SWITCHING REGULATOR

(75) Inventors: Roland Rupp, Lauf (DE); Ilia Zverev, München (DE); Michael Herfurth, Gilching (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/622,980

(22) Filed: Jul. 18, 2003

(65) Prior Publication Data

US 2004/0051513 A1 Mar. 18, 2004

(30) Foreign Application Priority Data

Jul. 18, 2002 (DE) .......................................... 102 32 677

(51) Int. Cl.[7] ................................................. G05F 1/40
(52) U.S. Cl. ...................................... 323/282; 323/901
(58) Field of Search ............................... 323/282, 283, 323/288, 901, 908

(56) References Cited

U.S. PATENT DOCUMENTS

| | | | | |
|---|---|---|---|---|
| 4,972,136 A | * | 11/1990 | Banura | 323/275 |
| 5,142,218 A | * | 8/1992 | Palara et al. | 323/285 |
| 5,161,096 A | * | 11/1992 | Newman | 363/49 |
| 5,717,318 A | * | 2/1998 | Matsuda et al. | 323/273 |
| 5,790,395 A | | 8/1998 | Hagen | |
| 6,366,070 B1 | * | 4/2002 | Cooke et al. | 323/284 |

FOREIGN PATENT DOCUMENTS

JP          61244271 A          10/1986

OTHER PUBLICATIONS

Author not listed: UCC28500,UCC28501, UCC28502, UCC38500, UCC38501, UCC38502 BiCMOS PFC/PWM Combination Controller, Unitrode Products from Texas Instruments, 2000, pp. 1–11.
Michael Herfurth: "Application Note; Active Harmonic Filtering for Line Rectifiers of Higher Output Power", *Siemens Components*, 1/86, pp. 9–13.

* cited by examiner

*Primary Examiner*—Adolf Berhane
(74) *Attorney, Agent, or Firm*—Laurence A. Greenberg; Werner H. Stemer; Gregory L. Mayback

(57) ABSTRACT

A switching regulator has a drive circuit, receiving an intermediate circuit input voltage, an output voltage of an intermediate circuit capacitor and an output current at a current measuring element and controls the electrical output parameters and the power factor of the switching regulator in accordance with an adjustable desired value by controlling the duty ratio of a power switch. The drive circuit has a start circuit for dynamically increasing a current limiting level for the power switch during a start time after the switch-on instant of the switching regulator from an initially low level up to a current-limiting desired level at the end of the start time. The loading current-time integral for the diode and the power switch of the power factor correction circuit of the switching regulator is the least with this soft start circuit. Moreover, noise due to abrupt magnetic driving of the inductor is avoided.

11 Claims, 4 Drawing Sheets

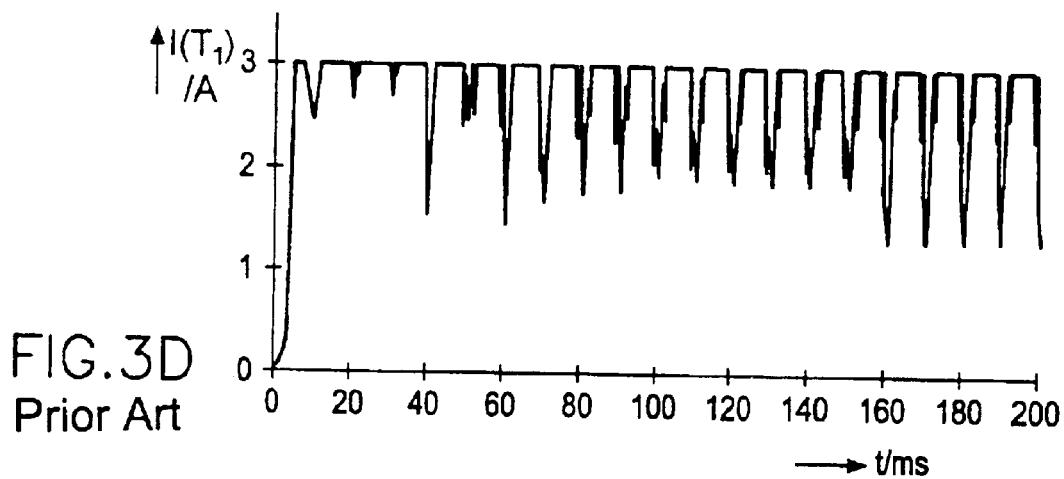
FIG. 3D Prior Art
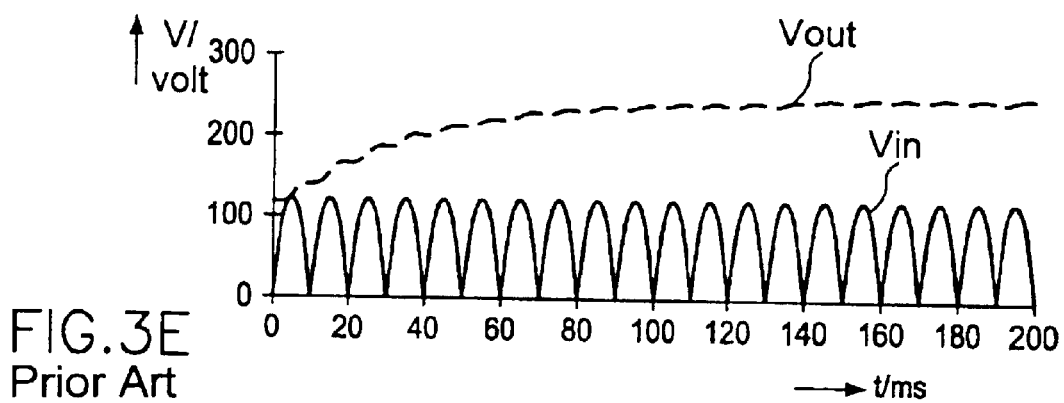
FIG. 3E Prior Art
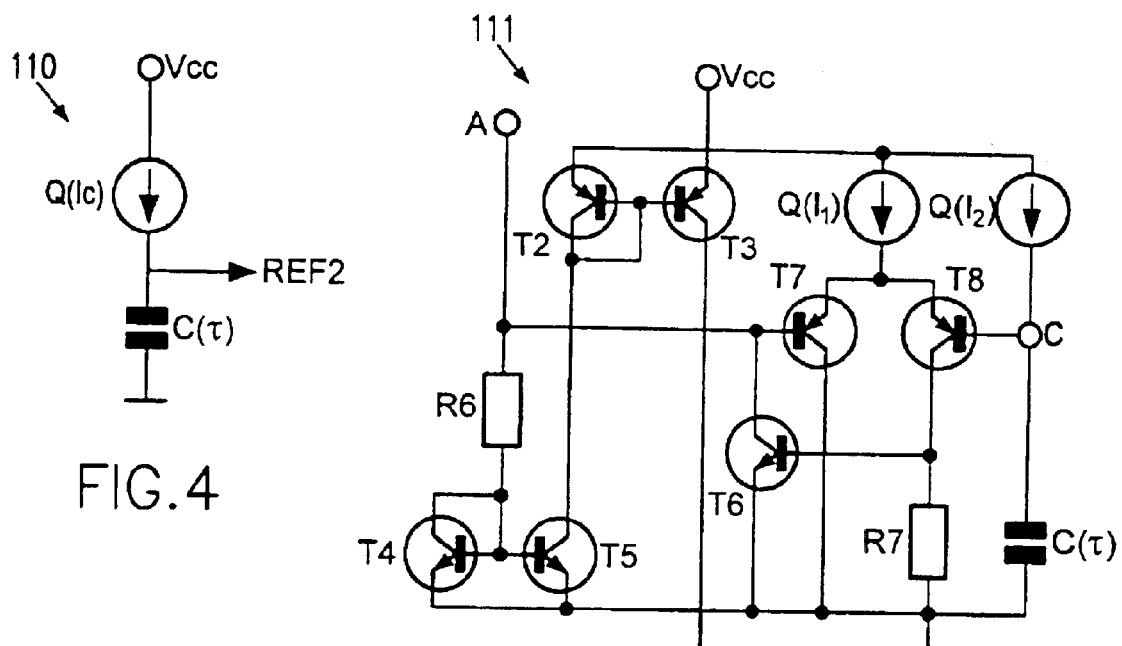
FIG. 4
FIG. 5

SWITCHING REGULATOR WITH DYNAMIC CURRENT LIMITING AND DRIVE CIRCUIT FOR THE SWITCHING REGULATOR

BACKGROUND OF THE INVENTION

Field of the Invention

The invention relates to a switching regulator and a drive circuit therefore. The drive circuit taps off an intermediate circuit input voltage of the switching regulator, an output voltage of the switching regulator available at an intermediate circuit capacitor, and an output current thereof at a current measuring element of the switching regulator and controls at least the electrical output parameters and the power factor of the switching regulator in accordance with an adjustable desired value by controlling the duty ratio of a power switch. The power switch is connected in parallel with the intermediate circuit capacitor through a diode and controls the charging current of the intermediate circuit capacitor.

A switching regulator of this type and a drive circuit of this type are disclosed in Siemens Components 1/86, pages 9 to 13, titled "Application Note; Active Harmonic Filtering for Line Rectifiers of Higher Output Power".

Generally, power supplies for various applications, for example for personal computers, charging units, plug-in power supply units, etc., are usually configured as pulsed switching regulators. Connected to such switching regulators is a drive circuit by which a number of functions of the switching regulator are realized, such as e.g.:

a) a control of the electrical parameters of the output of the switching regulator;

b) a control of some electrical parameters of the input of the switching regulator, in particular the power factor;

c) realization of a soft start of the switching regulator;

d) realization of various protection functions, such as overvoltage protection, overcurrent protection, undervoltage shutdown, etc.; and e) changeover of the switching regulator to various operating states, such as sleep mode, standby mode, protection mode, normal mode, startup mode, hick-up mode etc.

FIG. 1 schematically shows a switching regulator which is disclosed in the document mentioned above and whose intermediate circuit, containing a power switch T1, an inductor L1, a resistor R1, a diode D1, a diode D11 bridging the inductor L1 and the diode D1, and also an intermediate circuit capacitor C1, is used by way of example for the subject matter of the present application. A drive circuit 100 illustrated as a block in the lower part of FIG. 1 taps off the intermediate circuit output voltage Vout at the intermediate circuit capacitor C1, a voltage level indicating the present output current level at the resistor R1 connected in series in the intermediate circuit, and an input voltage level at the inductor L1 and generates. At least on the basis of these quantities, pulses are derived for controlling a duty ratio of the power switch T1 acting on the control gate.

The circuit configuration shown in FIG. 2 shows details of the drive circuit 100 disclosed in the above-mentioned document (with the exception of the circuit blocks 110 and 111 that are part of the invention of the instant application).

The drive circuit 100 shown in FIG. 2 contains, in so far as it is disclosed in the above document, a first control amplifier 101, which receives the output voltage Vout of the switching regulator and a desired voltage Vout, desired for the output voltage of the switching regulator at its inputs and generates, from these input signals, a first control voltage VR1 at its output. The first control voltage VR1 is fed to a multiplier 102, which receives, at a second input, the rectified input voltage $|vin|$ present at the intermediate circuit and generates, from these input quantities, a desired current level $I_{desired}$ at its output designated by A. In the drive circuit 100 which can be gathered from the above document, the point A is connected to the point B. Furthermore, the drive circuit 100 contains a second control amplifier 103, which receives, at one of its inputs, a signal derived from the desired current level $I_{desired}$ at the output of the multiplier 102 and a signal derived from the actual output current level Iout of the switching regulator and generates therefrom a second control voltage which is output at its output. The second control voltage is fed to a PWM block 104 and, through a summation element 105, to a driver 107, which applies drive pulses to the control gate of the power switch T1. The drive circuit 100 also contains a current limiting device in the form of a third control amplifier 106, which receives the actual output current level Iout of the switching regulator at one of its inputs and a reference signal Ref2 at the other input and whose output is fed to the summation element 105. The function of the third control amplifier 106 is explained below.

The known drive circuit described above forms a so-called active harmonic filter circuit, the function of which, in combination with the switching regulator illustrated in FIG. 1, leads to optimized efficiency and power factor values. The behavior of the switching regulator and the function of the drive circuit during the start of the switching regulator will be considered in greater detail below.

Before the switch-on of the power supply, i.e. before the application of the input voltage $|Vin|$ to the rectifier of the switching regulator, all energy stores, the inductances and capacitors are empty. In the event of the switch-on of the power supply, the grid voltage is suddenly connected to the system. This leads to large current surges during the charging of the capacitors (here of the intermediate circuit capacitor C1). The current surges can destroy components, principally the semiconductors, such as the power switch T1 and the diode D1. The initial charging of the relatively large intermediate circuit capacitor C1 in the event of the switch-on of the power supply effects a current surge ("inrush") which may exceed the maximum acceptable peak current intensity of the diode D1, which is a very fast diode. Likewise, the current surge may exceed the maximum current-carrying capacity of the input bridge rectifier.

The diode D11, which is connected in parallel with the inductor L1 and with the diode D1 and is a customary silicon diode, avoids the high current loading by initially charging the intermediate circuit capacitor C1 from the grid voltage (Vin) rectified by the bridge rectifier.

Another possible way of avoiding the high current surge in the event of switch-on consists in initially connecting a resistor in series with the intermediate circuit capacitor C1.

A soft start function to be realized by the drive circuit 100 is intended to protect the system components, principally the semiconductors, in the event of the switch-on of the power supply.

A known and widespread soft start solution is based on limiting the duty ratio (duty cycle) for the power switch T1 of the intermediate circuit, which is also known as a power factor correction (PFC) circuit. The duty ratio for the power switch is initially kept very low and increases with time until the control acts. This function is illustrated in the accompanying graphical representation of FIG. 3A, in which the curve d(T1) depicted by dashes represents the duty ratio d of the power switch T1 and the solid curve d(D1) represents the duty ratio at the diode D1 for 25 ms after the switch-on. Since the diode D1 carries the current during the rest of the switching period of the power switch T1, that is to say while the latter is switched off, a very large duty ratio is established for the diode D1 during the start, as is illustrated in FIG. 3A by the profile of the curve d(D1). At the same time, the maximum peak current in the power switch T1 and in the diode D1 will also reach very large values. This is illustrated by the curves $I_{max}(T1)$ and $I_{max}(D1)$ in the graphical representation of FIG. 3B (the peak values of these two currents are always identical).

The graphical representation of FIG. 3C shows the profile of the output voltage Vout (dashed curve) which builds up at the intermediate circuit capacitor in comparison with the rectified input voltage |Vin| of the intermediate circuit.

The average value of the current through the power switch T1 will remain relatively small because the duty ratio thereof is kept small by the soft start function (FIG. 3A). At the same time, however, the duty ratio for the diode D1 is very large, as shown by the curve d(D1) in FIG. 3A. This leads to very large average values of the current through the diode D1. The on-state losses in the diode are accordingly very large as well. This can lead to a destruction of the diode through overheating. There are practical confirmations of this.

The prior art discloses a combination of soft start with a constant current limiting that is brought about (by the third control amplifier 106 of the drive circuit 100), which protects the components as now described. First, the duty ratio for the power switch T1 is limited and, if the switch current reaches a defined level, it is immediately switched off. The constant current limiting of the current flowing through the power switch T1 is illustrated graphically in the accompanying FIG. 3D. In this case, the reference signal Ref2 at the control amplifier 106 is constant.

This method has the disadvantage that, depending on the current limit value prescribed by the reference signal Ref2, the situation can arise in which the necessary intermediate circuit voltage is not reached since the load continually draws the necessary current.

FIG. 3E illustrates, in the curve Vout depicted by dashes, in comparison with the intermediate circuit input voltage |Vin| (shown solid), by way of example, such a profile of the intermediate circuit output voltage in the case of a switched-on load. Given a current limiting of 3 A, a desired output voltage Vout, desired (e.g. 385 V dc), as prescribed at the first control amplifier 101, cannot be achieved.

Theoretically, in order to avoid this case, the current limiting level could be increased (by increasing the reference signal Ref2 at the input of the third control amplifier 106). In this case, however, as already explained, the diode D1 may be destroyed by overheating.

SUMMARY OF THE INVENTION

It is accordingly an object of the invention to provide a switching regulator with dynamic current limiting and a drive circuit for the switching regulator that overcomes the above-mentioned disadvantages of the prior art devices of this general type, which enables a drive circuit with a soft start function such that, during the start, no components, principally semiconductors, are destroyed and such that a soft start is ensured under all conditions with minimal loading on the components.

With the foregoing and other objects in view there is provided, in accordance with the invention, a switching regulator. The switching regulator contains an intermediate circuit capacitor at which an output voltage can be tapped, a current measuring element, a diode connected to the intermediate circuit capacitor, and a power switch connected to the current measuring element and connected in parallel with the intermediate circuit capacitor through the diode. The power switch controls a charging current of the intermediate circuit capacitor. A drive circuit receives an intermediate circuit input voltage, the output voltage from the intermediate circuit capacitor and an output current at the current measuring element. The drive circuit controls electrical output parameters and a power factor of the switching regulator in accordance with an adjustable desired value by controlling a duty ratio of the power switch. The drive circuit has a start circuit set up for dynamically increasing a current limiting level for the power switch during a specific start time after a switch-on instant of the switching regulator from an initially low level up to a current-limiting desired level at an end of the specific start time, without the drive circuit limiting the duty ratio of the power switch during the specific start time.

The principle on which the present invention is based resides in increasing the current limiting level for the power switch during a specific start time after the switch-on instant of the switching regulator dynamically from an initially low level to a higher desired level at the end of the start time. At the same time, the drive circuit does not limit the duty ratio of the power switch during the start time.

In a preferred embodiment, the start circuit increases the current limiting level continuously, rather than abruptly, during the start time. In this case, the rate of increase of the current limiting level is chosen such that the start of the switching regulator is ensured under all load conditions and such that a minimal loading on the components of the switching regulator is ensured. To that end, the start circuit has a time-determining element, in particular a capacitor that is charged with a specific constant current during the start time and determines the start time and the rate of increase.

With the foregoing and other objects in view there is further provided, in accordance with the invention, a drive circuit functioning as an active harmonic filter for driving a switching regulator. The switch regulator has an intermediate circuit, an intermediate circuit capacitor disposed in a shunt path of the intermediate circuit, a diode, and a power switch connected in parallel with the intermediate circuit capacitor through the diode and controls a charging current of the intermediate circuit capacitor. The drive circuit contains a first control amplifier receiving an actual output voltage from the intermediate circuit of the switching regulator and an adjustable desired output voltage. The first control amplifier generates a first control voltage from the actual output voltage and the adjustable desired output voltage. A multiplier is connected to the first control amplifier and receives the first control voltage and a rectified input voltage from the intermediate circuit of the switching regulator. The multiplier generates a desired current level from the first control voltage and the rectified input voltage. A second control amplifier receives, from the multiplier, the desired current level and a signal derived from an actual output current level of the intermediate circuit of the switching regulator. The second control amplifier generates a second control voltage in accordance with the desired current level and the signal derived from the actual output current level. A third control amplifier receives the actual output current level of the intermediate circuit of the switching regulator and a current-limiting desired value. The third control amplifier generates a third control voltage for controlling a maximum current level through the power switch from the actual output current level of the intermediate circuit of the switching regulator and the current-limiting desired value. A PWM driver circuit receives at least the second and third control voltages and generates corresponding control pulses for controlling a duty ratio of the power switch. A start circuit dynamically increases a current limiting level for the power switch during a specific start time after a switch-on instant of the switching regulator from an initially low level up to a current-limiting desired value at an end of the specific start time, without the drive circuit limiting the duty ratio of the power switch during the start time.

In a first exemplary embodiment, the start circuit is coupled to the reference input of the third control amplifier, which reference input prescribes the current limiting level, and contains a constant-current source and a capacitance at which it is possible to tap off the reference signal, which increases continuously during the start time, for the current limiting level.

In a second exemplary embodiment, the start circuit is connected between the output of the multiplier and the input of the second control amplifier of the drive circuit and realizes a profile of the signal fed to the input of the second control amplifier that rises in ramped fashion. In the case of the last-mentioned embodiment, the value of the current-limiting reference signal at the third control amplifier is constant again.

Other features which are considered as characteristic for the invention are set forth in the appended claims.

Although the invention is illustrated and described herein as embodied in a switching regulator with dynamic current limiting and a drive circuit therefor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3A–3E are graphs show signal profiles over time of the known switching regulator illustrated in FIG. 1;

FIG. 4 is a circuit diagram of a first exemplary embodiment of the start circuit according to the invention;

FIG. 5 is a circuit diagram of a second exemplary embodiment of the start circuit according to the invention;

DESCRIPTION OF THE PREFERRED EMBODIMENTS

Figure 1:
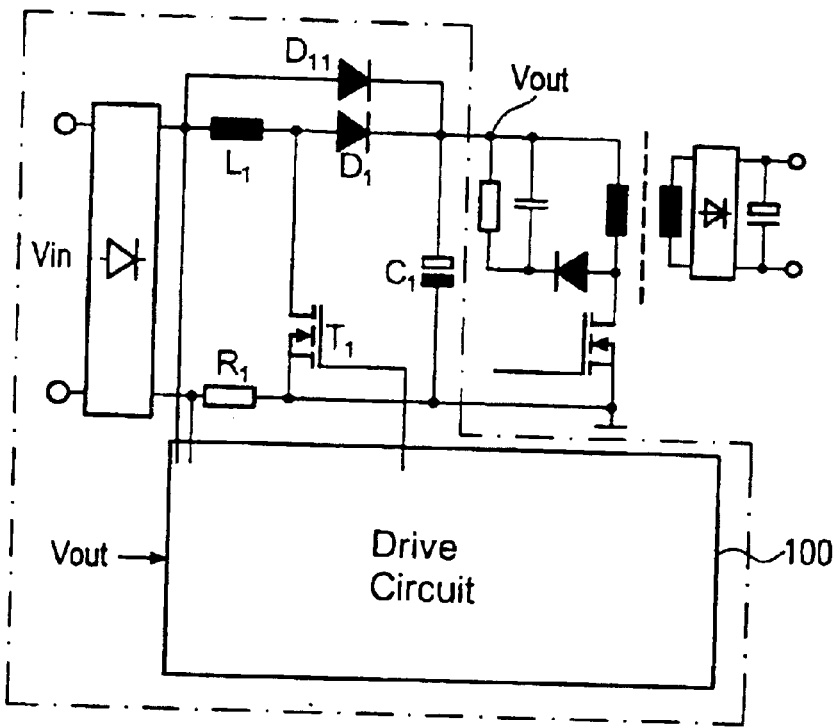
FIG. 1 is a circuit diagram of a known switching regulator with a drive circuit.
Figure 2:
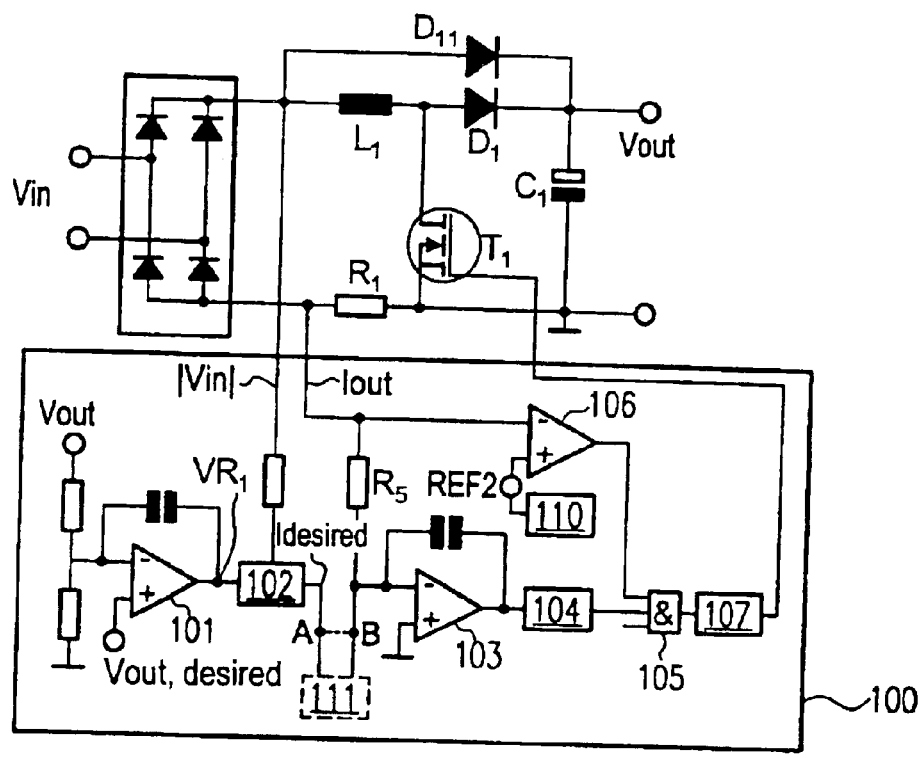
FIG. 2 is a circuit diagram showing details of the drive circuit of FIG. 1, but with modifications according to the invention for a start circuit.
Figure 3A:
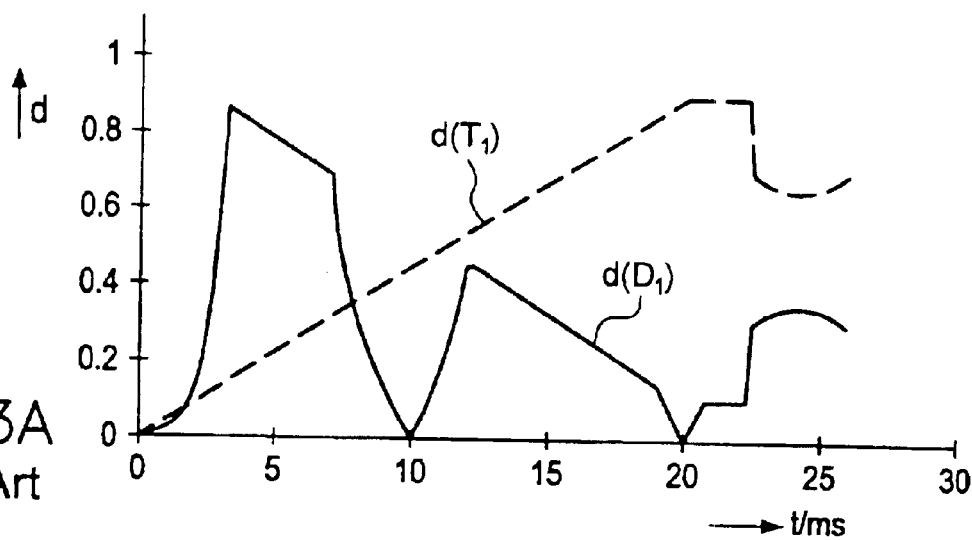
Figure 3B:
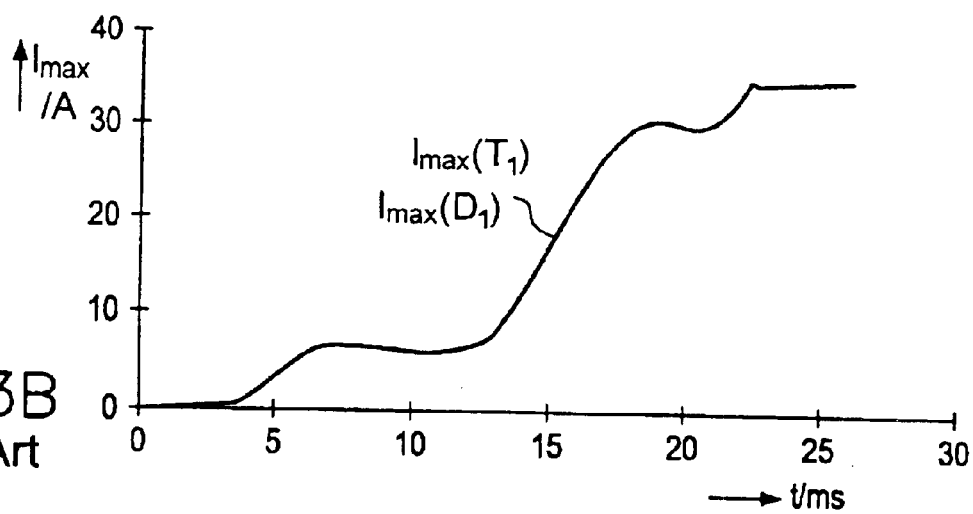
Figure 3C:
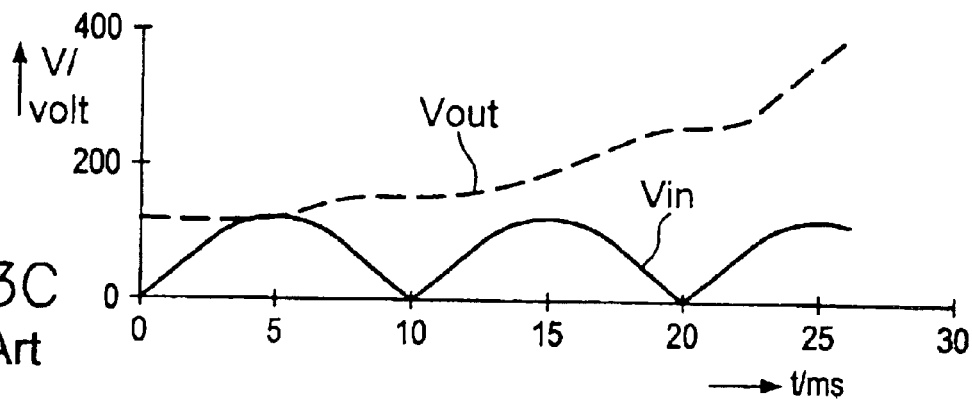

Referring now to the figures of the drawing in detail and first, particularly, to FIG. 4 thereof, there is shown a circuit diagram of a first exemplary embodiment of a start circuit according to the invention which is contained in the drive circuit 100 in accordance with FIG. 2. The start circuit being generally designated by 110. This simple exemplary embodiment of the start circuit contains a constant-current source Q(Ic), connected to an operating voltage Vcc, in series with a time-determining capacitor $C(\tau)$, which, in conjunction with the current supplied by the constant-current source Q(Ic), determines a start time duration $\tau$ and rate of increase of the ramped profile of a current-limiting reference signal Ref2.

Whereas in the prior art described above the current-limiting reference signal Ref2 in the drive circuit 100 was constant and thus caused a constant current limiting, the current-limiting reference signal Ref2 generated by the start circuit 110 according to the invention rises continuously, as mentioned, until it reaches a current-limiting desired level at the end of the start time $\tau$. What is essential in this case is that the drive circuit 100 does not limit the duty ratio of the power switch T1 during the start time $\tau$.

FIG. 5 schematically shows a second exemplary embodiment according to the invention of the start circuit which can be used in the drive circuit 100 in accordance with FIG. 2, the start circuit being generally designated by 111. The start circuit 111 is coupled in between an output A of the multiplier 102 and an input B of the second control amplifier 103 and is configured such that the output current at the terminal B is limited to a value which approximately results from the quotient of the ramped voltage at a node C and a resistor R6 (of course, the dashed connection from A to B in the drive circuit 100 in FIG. 2 is not present therein). The start circuit 111 illustrated in FIG. 5 contains a first current mirror (transistors T2, T3) connected to the terminal D and the supply voltage Vcc, a second current mirror (transistors T4, T5) connected to the resistor R6 and the low potential (ground), a comparator circuit (transistors T6, T7, T8), which compares the voltage dropped across the resistor R6 and the voltage present at the point C as a result of the charging of the time-determining capacitor $C(\tau)$, and also current sources Q(I1) and Q(I2) and a resistor R7. The signal at the terminal D is increased until Vout has reached its desired value Vout, desired.

Figure 6A:
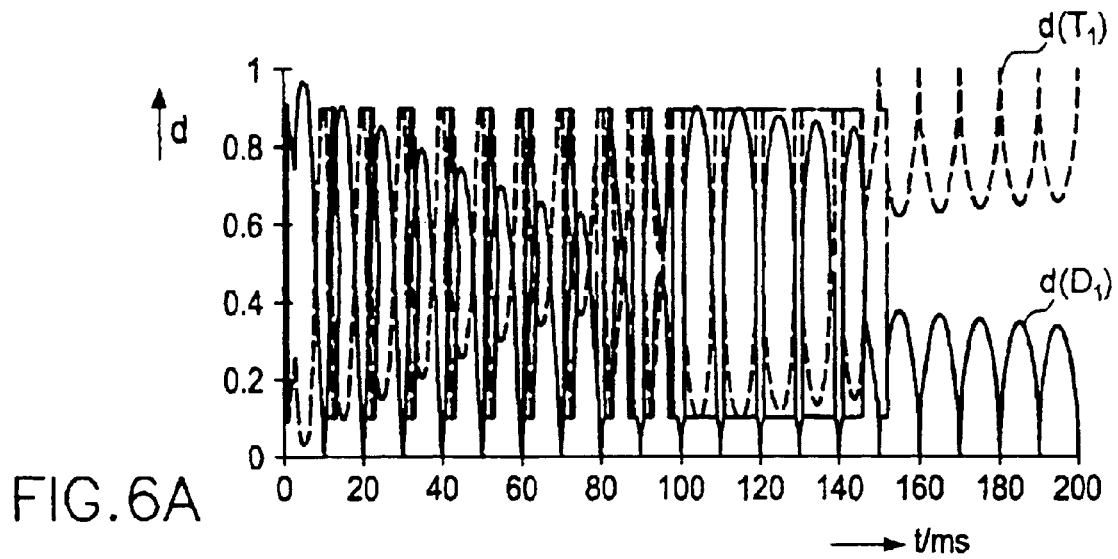
FIG. 6A is a graph showing duty ratio curves of a power switch and of a step-up converter diode of an intermediate circuit during a start time of the switching regulator.
Figure 6B:
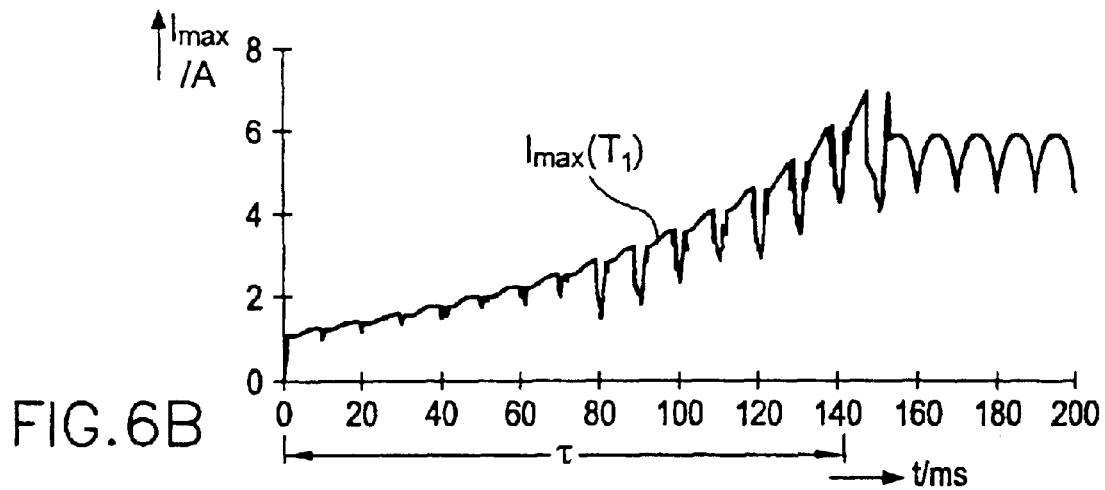
FIG. 6B is a graph showing the effect of the continuously increased current limiting for the current through the power switch of the switching regulator.
Figure 6C:
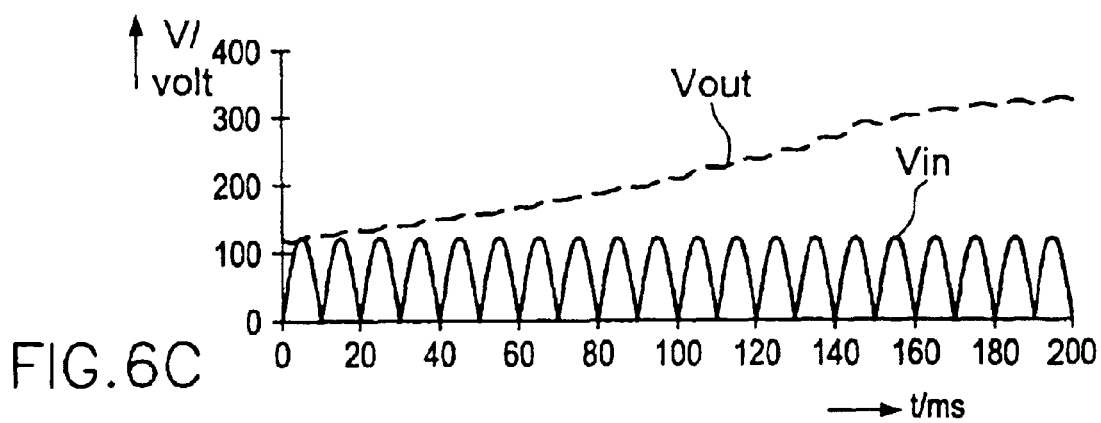
FIG. 6C is a graph showing a profile in each case of the output voltage and of the input voltage of a switching regulator according to the invention during the start time.

The profiles of the duty ratio d(T1) and d(D1) respectively through the power switch T1 and the diode D1 of the intermediate circuit of the switching regulator, which profiles are achieved with the two exemplary embodiments 110 and 111 of the start circuit respectively illustrated in FIGS. 4 and 5, are illustrated in FIG. 6A. It is assumed in this case, as stated, that the duty ratio for the power switch T1 is not limited. By dynamically continuously increasing the current-limiting desired value from an initially small value up to a large value at the end of the start time, the intermediate circuit capacitor C1 is charged with a gradually increasing current. The output voltage thus also rises with the load connected. These conditions are illustrated graphically in FIGS. 6B and 6C. FIG. 6B shows the current limiting value Imax(T1) of the current through the power switch T1, which current limiting value rises over the start time $\tau$(e.g. 140 ms) from a small value up to a large value and continuously, while FIG. 6C shows with a broken line the profile of the output voltage Vout in comparison with the input voltage |Vin| during the start time. In the case of such a soft start function affected according to the invention with increasing output current, the start-up is ensured under all load conditions (FIG. 6C). This method also effects the least loading for the step-up converter diode D1, because as the current increases, the duty ratio of the diode D1 decreases on account of an increasing output voltage (see FIG. 6A, the solid curve d(D1)). As a result, a soft start is ensured under all conditions with minimal loading on the components of the switching regulator.

The invention realizes an advantageous drive function during the start-up of a switching regulator in the intermediate circuit thereof (power factor control section) through continuously increasing the level of the current limiting with time (start time τ). The loading current-time integral for the diode D1 and the power switch T1 is the least as a result of the start circuit proposed according to the invention. Moreover, development of noise on account of abrupt magnetic driving of the inductor L1 is avoided during the start.

The soft start realized according to the invention makes it possible to use a diode D1 with a lower current-carrying capacity, as a result of which the system costs can be lowered.

We claim:

1. A switching regulator, comprising:
   an intermediate circuit capacitor at which an output voltage can be tapped;
   a current measuring element;
   a diode connected to said intermediate circuit capacitor;
   a power switch connected to said current measuring element and connected in parallel with said intermediate circuit capacitor through said diode, said power switch controlling a charging current of said intermediate circuit capacitor; and
   a drive circuit receiving an intermediate circuit input voltage, the output voltage from said intermediate circuit capacitor and an output current at said current measuring element, said drive circuit controlling electrical output parameters and a power factor of the switching regulator in accordance with an adjustable desired value by controlling a duty ratio of said power switch, said drive circuit having a start circuit set up for dynamically increasing a current limiting level for said power switch during a specific start time after a switch-on instant of the switching regulator from an initially low level up to a current-limiting desired level at an end of the specific start time, without said drive circuit limiting the duty ratio of said power switch during the specific start time.

2. The switching regulator according to claim 1, wherein said start circuit continuously increases the current limiting level.

3. The switching regulator according to claim 2, wherein said start circuit has a time-determining element for determining the specific start time and a rate of increase of the current limiting level.

4. The switching regulator according to claim 3, wherein said start circuit increases the current limiting level with a rate of increase such that a start of the switching regulator is ensured under all load conditions.

5. The switching regulator according to claim 2, wherein said start circuit increases the current limiting level with a rate of increase such that a minimal loading on components of the switching regulator is ensured during a start of the switching regulator.

6. A drive circuit functioning as an active harmonic filter for driving a switching regulator having an intermediate circuit, an intermediate circuit capacitor, disposed in a shunt path of the intermediate circuit, a diode, and a power switch connected in parallel with the intermediate circuit capacitor through the diode and controls a charging current of the intermediate circuit capacitor, the drive circuit comprising:
   a first control amplifier receiving an actual output voltage from the intermediate circuit of the switching regulator and an adjustable desired output voltage, said first control amplifier generating a first control voltage from the actual output voltage and the adjustable desired output voltage;
   a multiplier connected to said first control amplifier and receiving the first control voltage and a rectified input voltage from the intermediate circuit of the switching regulator, said multiplier generating a desired current level from the first control voltage and the rectified input voltage;
   a second control amplifier receiving, from said multiplier, the desired current level and a signal derived from an actual output current level of the intermediate circuit of the switching regulator, said second control amplifier generating a second control voltage in accordance with the desired current level and the signal derived from the actual output current level;
   a third control amplifier receiving the actual output current level of the intermediate circuit of the switching regulator and a current-limiting desired value, said third control amplifier generating a third control voltage for controlling a maximum current level through the power switch from the actual output current level of the intermediate circuit of the switching regulator and the current-limiting desired value;
   a PWM driver circuit receiving at least the second and third control voltages and generating corresponding control pulses for controlling a duty ratio of the power switch; and
   a start circuit dynamically increasing a current limiting level for the power switch during a specific start time after a switch-on instant of the switching regulator from an initially low level up to a current-limiting desired value at an end of the specific start time, without the drive circuit limiting the duty ratio of the power switch during the start time.

7. The drive circuit according to claim 6, wherein:
   said multiplier has an output;
   said second control amplifier has an input; and
   said start circuit is connected to said output of said multiplier and said input of said second control amplifier, said input of said second control amplifier receives the signal derived from the actual output current level of the switching regulator, said start circuit configured to give the signal a profile rising in a ramped fashion.

8. The drive circuit according to claim 6, wherein:
   said third control amplifier has an input; and
   said start circuit is connected to said input of said third control amplifier, said input of said third control amplifier receives the current-limiting desired value, said start circuit configured to give the current limiting level a profile rising in a ramped fashion.

9. The drive circuit according to claim 6, wherein said start circuit has a time-determining element for setting the specific start time and a rate of increase of the current limiting level rising in a ramped fashion.

10. The drive circuit according to claim 6, wherein said start circuit increases the current limiting level with a rate of increase such that the start of the switching regulator is ensured under all load conditions.

11. The drive circuit according to claim 6, wherein said start circuit increases the current limiting level with a rate of increase such that a minimal loading on components of the switching regulator is ensured during the start of the switching regulator.

* * * * *